Nov. 14, 1967  W. B. DARR  3,352,732
STATIC BALANCING METHOD
Filed March 1, 1965  2 Sheets-Sheet 1
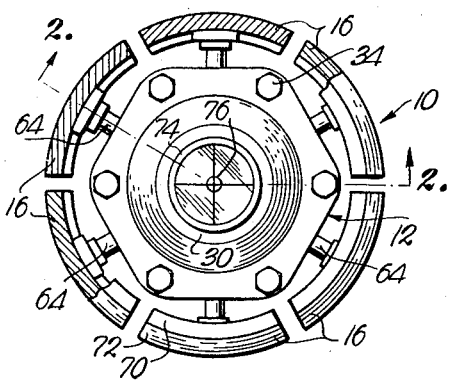
Fig. 1.
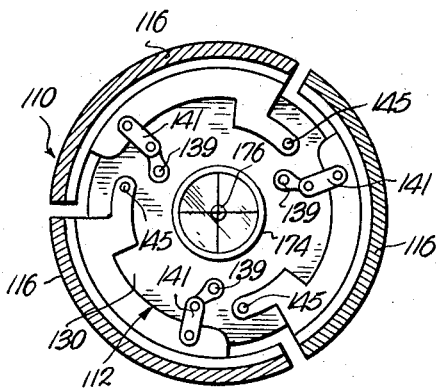
Fig. 4.
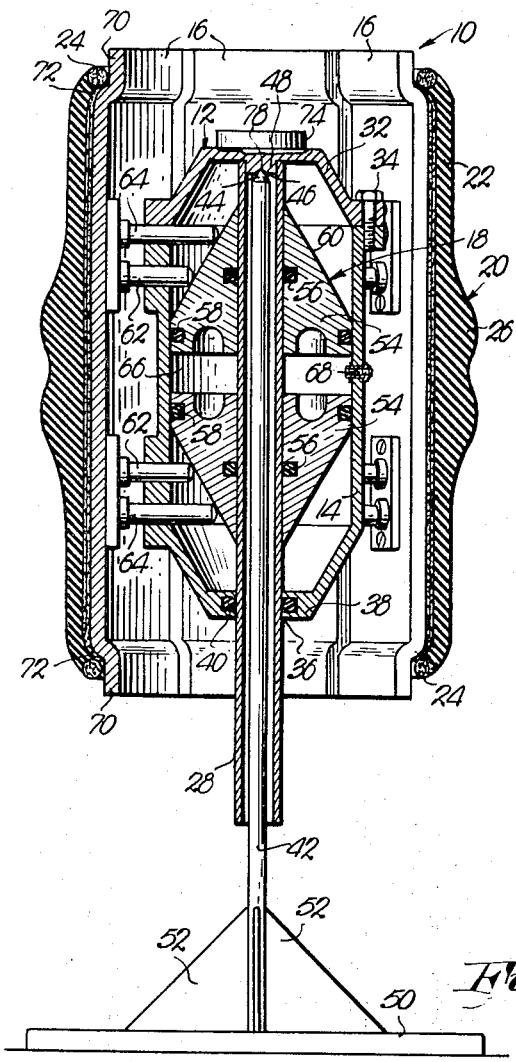
Fig. 2.
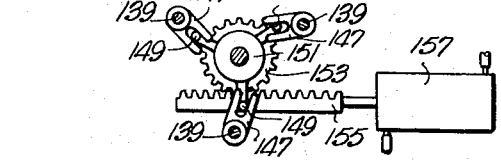
Fig. 3.
Fig. 5.
INVENTOR.
Wayne B. Darr
BY
Hovey, Schmidt, Johnson & Hovey
ATTORNEYS.

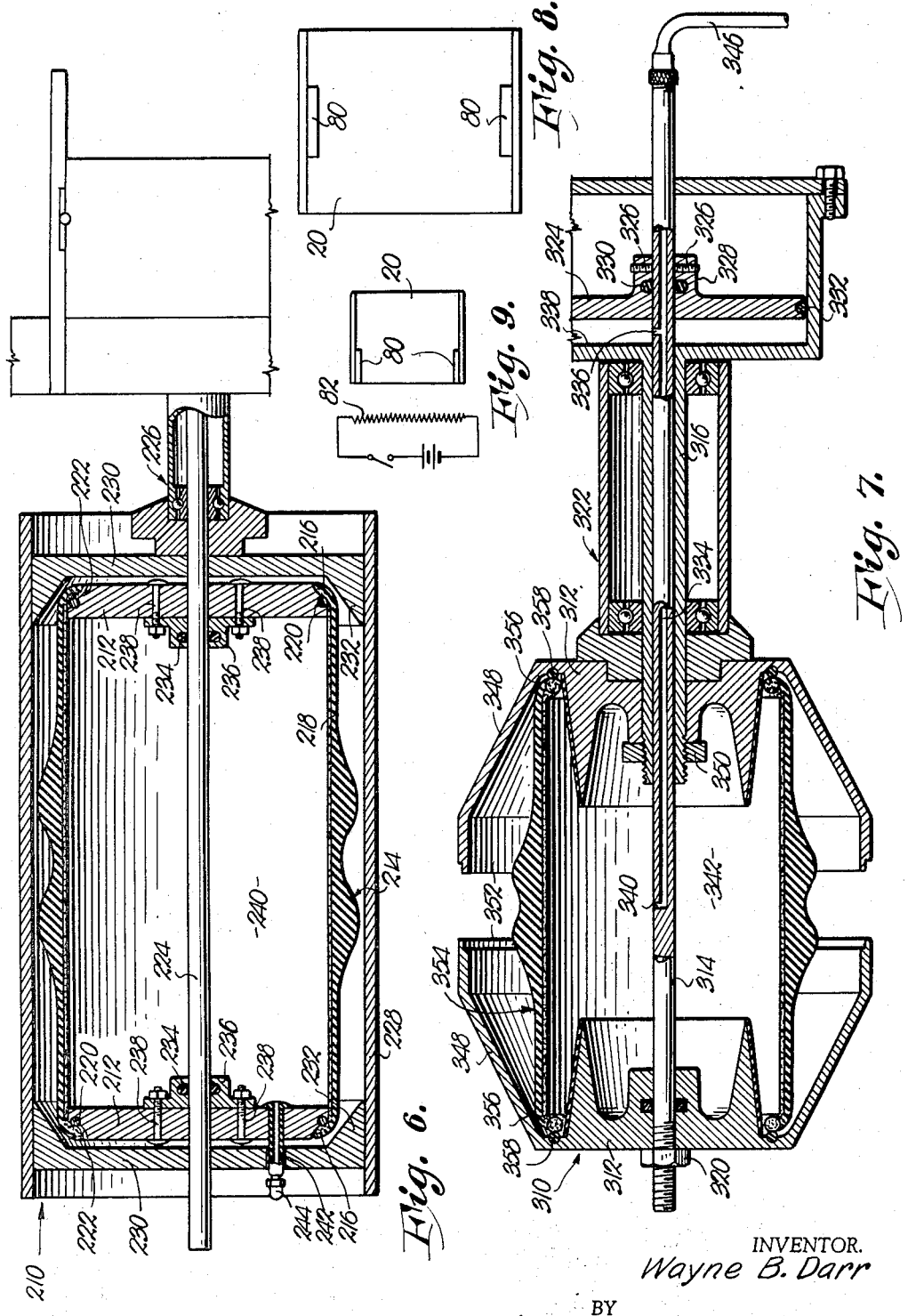

3,352,732
STATIC BALANCING METHOD
Wayne B. Darr, N. Main St., Seneca, Mo. 64865
Filed Mar. 1, 1965, Ser. No. 435,842
17 Claims. (Cl. 156—75)

ABSTRACT OF THE DISCLOSURE

An uncured tire is balanced by first supporting the tire with its ends or beads in axial alignment with each other, and then mounting the supported tire for free movement about an axis passing therethrough in order that the tire may seek a state of static equilibrium. Once equilibrium is reached, the heavy portion of the tire contributing to the unbalanced condition presents the lowermost extremity thereof, and the tire is then counterbalanced by securing a pair of strips of uncured plastic material to the tire adjacent respective beads at locations on the opposite side of the tire from the lowermost extremity. When cured, the strips are fused to the tire, thus further balancing of the finished product is not required.

---

This invention relates to the balancing of green tires and has as its primary object the provision of a method of balancing green tires prior to the curing of the same, whereby the finished tires will be properly in balance to conform with minimum balance requirements.

Green tires, the name generally applied to tires before they are cured by a vulcanization process in suitable molds, are usually unbalanced for one reason or another so that, when a green tire is cured and molded, the resulting finished tire is also unbalanced. Oftentimes the imbalance of the finished product is greater than that which will be accepted by certain users. For instance, new car manufacturers require that the tires to be placed on newly manufactured automobiles have an imbalance no greater than 20" ounces. Many tires made by conventional curing and molding techniques have an imbalance greater than 20" ounces so that these tires must be utilized for purposes other than for placement on new automobiles.

New tires can be balanced by applying a layer of paint or other flowable material to the inner surface of the tire at the light spot thereon to counterbalance the unbalanced weight of the tire. However, new car manufacturers will not accept tires balanced in this manner. Moreover, the weight applied to the tire by the use of such a layer of paint weakens the tire over an extended period of time inasmuch as the layer serves as a boot which prevents uniform flexing of the tire throughout its circumferential length.

To minimize the balance problems associated with new tires the present invention provides a method and means for actually balancing the green tire before the same is cured and molded. Hence, a finished tire that has been balanced in its green state will generally meet even the most rigid requirements with respect to the balance thereof. By the use of the present invention, also, certain steps now required to check the balance of newly finished tires may be eliminated so as to render the manufacture of tires significantly more efficient than is capable with conventional manufacturing techniques.

According to the present invention, the weight and location of the unbalanced portion of a green tire is initially determined by statically balancing the same and, thereafter, a pair of strips are secured to the ends thereof to counterbalance the unbalanced portion thereof. The strips are formed of the same material as the outer carcass of the tire itself so that the strips will fuse with the carcass as the tire is cured and molded. The strips blend with the tire so that little, if any, trace of the strip remains on the tire after it has been cured and molded.

It is, therefore, another object of this invention to provide improvements in the static balancing of tubular, flexible, unbalanced members wherein a pair of weights are applied to such a member adjacent the ends thereof to counterbalance the unbalanced portion thereof so that the member will be in static balance for all locations thereof about an axis passing therethrough.

Still another object of the instant invention is the provision of a method of statically balancing a green tire of plastic material by applying a pair of strips formed of such material to the tire adjacent to the ends thereof so that the strips will counterbalance the unbalanced portion of the tire and will fuse into the main body thereof when the tire is cured and molded to thereby circumvent any problems of maintaining the strips affixed to the tire itself.

A further object of the present invention is the provision of apparatus for statically balancing a green tire wherein the tire is initially supported for rotation by the inflating of the tire so that the wrinkles or creases in the tire will be smoothed out and the same will be symmetrical about its center line to thereby assure proper determination of the weight and location of its unbalanced portion.

Another object of the invention is the provision of apparatus for the static balancing of a green tire wherein mechanical pressure is uniformly applied to specific locations on the inner surface of the tire along substantially the entire length thereof, whereby the wrinkles of the tire will be effectively smoothed out prior to the rotation of the tire to thereby assure the proper determination of the weight and location of the unbalanced portion thereof.

In the drawings:

FIGURE 1 is a top plan view of one embodiment of the apparatus for carrying out the method of balancing a green tire;

FIG. 2 is a cross-sectional view taken along line 2—2 of FIG. 1;

FIG. 3 is a cross-sectional view of a second embodiment of the apparatus for carrying out the method;

FIG. 4 is a cross-sectional view taken along line 4—4 of FIG. 3;

FIG. 5 is a cross-sectional view taken long line 5—5 of FIG. 3;

FIG. 6 is a cross-sectional view of a third embodiment of the appartaus for carrying out the method;

FIG. 7 is a cross-sectional view of a fourth embodiment of the apparatus for carrying out the method;

FIG. 8 is a side elevational view of a green tire after the same has been statically balanced and before the same is cured and molded; and FIG. 9 is a schematic view showing the application of heat to the green tire so that a pair of counterbalancing, plastic strips thereon may fuse with the main body of the tire.

The first embodiment of the apparatus for balancing a green tire, denoted by the numeral 10, is illustrated in FIGS. 1 and 2 and includes an expandable mechanism 12 having a centrally disposed housing 14, a plurality of shiftable shoes 16, and means 18 for shifting shoes 16 radially outwardly of housing 14. Mechanism 12 is adapted for supporting a green tire 20 having a continuous side wall 22, and a pair of continuous beads 24 secured to side wall 22 at the ends thereof as shown in FIG. 2.

Green tire 20 is formed in a conventional manner by wrapping strips of an inner ply material on a drum and thereafter wrapping strips of the plastic or rubber material on the outer surface of the outermost ply material; in this condition, tire 20 is flexible and requires support from within to place the same in the disposition thereof shown in FIG. 2 with the ends of side wall 22, i.e., beads 24, in axial alignment with each other and with the wrinkles in side wall 22 substantially smoothed out. When tire 20 is supported, side wall 22 is symmetrically disposed about the center line of tire 20. To cure and mold tire 20 into its final shape, tire 20 is placed in a suitable mold and beads 24 are moved toward each other while the enlarged portion 26 of tire 20 moves laterally outwardly of the center line thereof. Portion 26 eventually forms the tread of the finished tire, while the continuous stretch of side wall 22 between each bead 24 and portion 26 forms the side wall of the finished product.

Housing 14 surrounds a support tube 28 rigid at one end thereof to a flat plate 30 having a conical extension 32 secured by bolt means 34 to one extremity of housing 14. Tube 28 passes through an opening 36 in a plate 38 defining the opposite extremity of housing 14, there being an O-ring seal 40 for sealing the interior of housing 14 from the atmosphere surrounding the same. A support rod 42 is disposed within tube 28 and has a conical pivot element 44 engaging the spherically concave surface 46 of a bearing 48 secured to the inner surface of plate 30. Rod 42 is normally maintained in an upright position by a support plate 50 secured thereto. A number of braces 52 serve to strengthen the connection of rod 42 with plate 50.

Means 18 includes a pair of pistons 54 shiftably mounted on tube 28 for movement longitudinally thereof. Housing 14 is substantially cylindrical throughout the major portion of its length and is concentric with tube 28 so that pistons 54 move axially with respect to housing 14. An O-ring seal 56 is disposed between each piston 54 and tube 28 and an O-ring seal 58 is disposed between each piston 54 and the inner surface of housing 14.

Each piston 54 has a conical, outer surface 60 for engaging a pair of pins 62 and 64 which are slidably disposed through housing 14 and are secured to a respective shoe 16. Pin 62 of each shoe 16 is closer to the center of housing 14 than in pin 64; accordingly, pin 62 is shorter than pin 64. As a result, pins 62 and 64 move simultaneously outwardly upon engagement with surface 60 so as to shift the coresponding shoe 16 laterally outwardly.

The space 66 between pistons 54 defines an air chamber for receiving air under pressure from a valve 68 carried by housing 14. Pistons 54 are initially disposed so that the same move axially of housing 14 and away from each other through the same distance as air under pressure is directed into space 66. Since each shoe 16 has a pair of pins 62 and 64 on each side of the center of housing 14, shoes 16 are uniformly forced radially outwardly at the same time under the influence of the movement of pistons 54 away from each other. The radial distance of travel of shoes 16 is sufficient to not only support the inner surface of tire 20, but also to smooth out all wrinkles or creases in side wall 22 thereof. Each shoe 16 has an offset portion 70 at each extremity thereof so as to define a recess 72 for the corresponding bead 24 as shown in FIG. 1.

Spirit level 74 is mounted on the upper surface of plate 30 and has a bubble 76 which permits visual observation of the tilting of tire 20 with respect to the horizontal axis passing through the intersection of element 44 and surface 46. Electronic circuitry (not shown) may be utilized with tube 28 to denote the tilting of the same with respect to rod 42 when mechanism 12 and tire 20, as a unit, seek static balance when all restraints are removed therefrom. Such circuitry could then be utilized to determine the weight and position of the unbalanced portion or weight of tire 20. Mechanism 12 is balanced without tire 20 thereon so that tube 28 will be concentric with rod 42 for all positions of housing 14 about rod 42.

The method of the present invention, when utilized with the apparatus of FIGS. 1 and 2, includes the step of placing green tire 20 on mechanism 12 with beads 24 aligned with recesses 72. Air or other fluid is introduced under pressure into space 66 to force pistons 54 away from each other and, in turn, to force pins 62 and 64 of corresponding shoes 16 radially outwardly. Shoes 16 will thus move simultaneously into engagement with the inner surface of tire 20 and will contact the same at circumferentially spaced, longitudinally extending locations. Since shoes 16 all travel the same distance at the same time, tire 20 will be uniformly supported at its inner surface and throughout its entire length. Side wall 22 will be disposed in concentric, symmetrical relationship to tube 28 and beads 24 will be in axial alignment with each other and concentric to the center of tire 20.

All restraints are removed from tire 20 which tend to prevent rotation thereof about the axis defined by the intersection of element 44 and surface 46. This axis, for convenience, is denoted by the numeral 78 and passes through the center line of mechanism 12, as well as the center line of tire 20, such center lines being coextensive with each other. As the restraining forces on tire 20 are removed, the same will pivot or rotate about axis 78 until static balance is attained. This movement comprises free rotation and is caused by the unbalanced portion or weight of tire 20. When static balance is attained, the unbalanced portion of tire 20 will be on one side thereof in a vertical plane passing through the lowermost extremity of tire 20 in its statically balanced position. The arc through which mechanism 12 and tire 20 is swung to attain static balance may be visually observed by the position of bubble 76 and may be determined electronically by the aforesaid circuitry if the same is utilized.

Upon determination of the weight of the unbalanced portion of tire 20 and the location of the vertical plane passing therethrough, a pair of strips 80 are selected for counterbalancing the unbalanced portion of tire 20. Strips 80 are formed from the same material comprising the outer carcass of tire 20 so that, when strips 80 are bonded or otherwise secured to side wall 22, such strips 80 will become fused therewith and form a part of the tire as the latter is cured and molded. The sum of the weights of strips 80 is equal to the weight of the unbalanced portion of tire 20.

Strips 80 are secured to tire 20 adjacent to the ends thereof, i.e., adjacent to beads 24 as illustrated in FIG. 8. Strips 80 are disposed on the side of tire 20 opposite to the side having the lowermost extremity so as to counterbalance the aforesaid unbalanced portion. The centers of gravity of strips 80 are disposed substantially at the intersection of the above-mentioned plane and said opposite side of tire 20. Hence, strips 80 define weights which are disposed on the side of tire 20 diametrically opposed to the side having the unbalanced portion or weight. Strips 80 are positioned as closely as possible to the ends of tire 20 so that, when the latter is cured and molded, there will be a minimum expansion of strips 80 at the longitudinal edges thereof.

After strips 80 have been secured to tire 20 the same is removed from mechanism 12 and is then ready for the the curing and molding steps to complete the manufacture of the finished product. For purposes of illustration, FIG. 9 illustrates the way in which heat is applied to tire 20 and strips 80 as that the latter will fuse into side wall 22 so as to form a part thereof. An electrical resistance 82 is electrically coupled to a source 84 of electrical power and the heat radiating from resistance 82 is absorbed by tire 20 and strips 80, the heat being sufficient to fuse trips 80 with tire 20.

In effect, therefore, FIG. 9 illustrates the way in which tire 20 may be cured, at least to a limited extent, with strips 80 thereon. When the curing and molding process steps have been completed, the finished tire will be substantially in balance throughout and any imbalance thereof will be less than the maximum imbalance which is acceptable by users who rely upon very rigid requirements. Such imbalance of the finished product will be generally due to defects in the curing and molding processes and not in the balancing method of the instant invention. The present invention, therefore, provides a simple and expeditious way of balancing a green tire immediately after the same is formed and immediately prior to being cured and molded.

Apparatus 10 is especially adaptable for use with production lines inasmuch as provision could be made for moving tire 20 along a horizontal path by means of a conveyor, and moving mechanism 12 into tire 20 from beneath through the lower open end thereof. To accomplish this, plate 50 may be reciprocable in a vertical direction so as to be capable of moving into and out of tire 20. Additional structure could be utilized for a quick release connection with valve 68 so that air under pressure may be easily directed into and out of space 66. It is to be noted that as pistons 54 move toward each other, shoes 16 will move radially inwardly under the influence of the slight tension placed on tire 20 by the radially outward movement of shoes 16. Departures from the structure of apparatus 10 may be made without departing from the spirit or scope of the instant invention.

The second embodiment of the apparatus of this invention, denoted by the numeral 110, includes expandable mechanism 112 having a plurality of shoes 116 similar in all respects to shoes 16 of apparatus 10. The distinction between apparatus 110 and apparatus 10 is the way in which shoes 116 are forced radially outwardly and into engagement with the inner surface of a tire such as tire 20 surrounding mechanism 112. In this respect, a tube 128 surrounds a rod 142 having a cone element 144 in engagement with a spherical concave surface 146 on bearing 148 rigid to an upper plate 130. The upper end of tube 128 is rigid to the lower surface of plate 130 and also is rigid intermediate its ends with a lower plate 138. Plates 130 and 138 provide supports for a number of generally upright shafts 139, each having a pair of vertically spaced toggle linkages 141 and 143 interconnecting the same with a corresponding shoe 116, the latter being rockably mounted on a shaft 145 passing through each of the plates 130 and 138.

The lower end of each shaft 139 is provided with a bifurcated foot 147 which receives a part of an L-shaped member 149 secured to a disc 152 which, in turn, is rigid to one face of a pinion 153. A rack 155 meshes with pinion 153, the latter being rotatably mounted in any suitable manner on the lower end of rod 142. Rack 155 is shifted in opposed directions by fluid piston and cylinder assembly 157 coupled therewith.

In use, assembly 157 is actuated to rotate pinion 153 in a direction to, in turn, rotate shafts 139 simultaneously. As shafts 139 rotate, linkages 141 are increased in length to, in turn, force shoes 116 outwardly against the inner surface of a tire surrounding mechanism 112. Shoes 116 will be locked in place by the over-center action of linkages 141 and shafts 139 need only be rotated in the opposite direction to remove the mechanical pressure exerted by shoes 116 on the tire.

After the tire is supported on mechanism 112, static balance is attained by allowing the tire and mechanism 112 to rotate freely as a unit about the horizontal axis through the inner section of element 144 and surface 146 until static balance is attained. Members 149, disc 151, pinion 153, and rack 155 may be conveniently shifted away from the lower end of tube 128 so as not to interfere with the tilting movement of mechanism 112. Such tilting movement may be visually observed by a spirit level 174 mounted on the upper surface of plate 130 and having a bubble 176 denoting the location of the vertical plane in which the tilting occurs. The tilting of mechanism 112 and the tire thereon as a unit is caused by the unbalanced weight of the tire, it being understood that mechanism 112 is initially statically balanced so that any imbalance will be due to the tire alone.

After the weight and location of the unbalanced portion of the tire have been determined, the tire is counterbalanced in the same way as that described above with respect to the counterbalancing of tire 20. The tire is then cured utilizing the structure shown schematically in FIG. 9 so that the strips applied to the tire will fuse therewith and form a part thereof.

A third embodiment of the apparatus denoted by the numeral 210 is illustrated in FIG. 6 and includes a pair of closure discs 212 for disposition within the open ends of a green tire 214 having a pair of continuous beads 216, and a continuous side wall 218 spanning the distance between beads 216. A continuous O-ring seal 220 is provided within the recess 222 of each disc 212 for sealing the junction between the corresponding bead 216 and the adjacent disc 212.

Discs 212 are secured to a shaft 224 mounted for rotation about a horizontal axis by journal means broadly denoted by the numeral 226. A cylindrical shell 228 is concentric with shaft 224 and has a pair of end plates 230 for mounting the same thereon. Each plate 230 has an annular beveled portion 232 which is aligned with recess 222 in the corresponding disc 212.

A pair of O-ring seals 234 carried by holders 236 are secured by bolts 238 to the adjacent discs 212. The space 240 between discs 212 and circumscribed by tire 214 is thus rendered airtight so that air under pressure directed into space 240 through tube 242 and valve 244 will inflate tire 214. Shell 228 provides a backing support for tire 214 to prevent any substantial laterally outward movement thereof as tire 214 is inflated. The inflation of tire 214 smooths out all wrinkles or creases in side wall 218 thereof so that beads 216 are in axial alignment with each other and side wall 218 is concentric and symmetrically disposed about the center line of tire 214, such center line being extensive with the longitudinal axis of shaft 224.

To place apparatus 210 in use, discs 212 are positioned within the open ends of tire 214 as shown in FIG. 6, discs 212 then being disposed on shaft 224, following which shell 228 and plates 230 are mounted on shaft 224. Tire 214 is then inflated until the inner surface thereof is substantially supported against collapsing. In this condition, all of the creases or wrinkles in side wall 218 will have been removed, the outer surface of tire 214 will be supported by shell 228, the beads 216 will be supported against outward movement by beveled portions 232.

To balance tire 214, all restrains are removed from apparatus 210 so that tire 214 will rotate freely about the axis of shaft 224 and discs 212, shell 228 and plates 230 until static equilibrium is attained. When such a condition is reached, the unbalanced portion of tire 214 will be at the lowermost extremity of the tire, it being understood that apparatus 210 will have initially been balanced so any imbalance will be due to tire 214 alone.

Shell 228 is then preferably marked to indicate the uppermost extremity of the unit defined by apparatus 210 and tire 214. As tire 214 is removed from apparatus 210, the appropriate weights in the form of strips similar to strips 80, may be applied to the tire adjacent to beads 216 thereof in the manner described above with respect to tire 20. Other ways of marking the plane of the light spot of tire 214 may be employed, if desired. The strips applied to tire 214 may become fused therewith by curing the same, such as by subjecting the strips and tire to heat in the manner illustrated in FIG. 9. After the balancing strips have been applied to tire 214, discs 212 are removed therefrom and the tire is ready to be cured and molded. Discs 212 are then ready for use with a new green tire to be balanced.

A fourth embodiment of the apparatus of the instant invention, denoted by the numeral 310, includes a pair of closures 312 mounted on a rotatable shaft 314 telescopically received within a tube 316 rigid to a housing 318. A nut 320 threaded on one end of shaft 314 retains the adjacent closure 312 on shaft 214, the other closure 312 being secured to tube 316. Journal means 322 mounts tube 316 and thereby, shaft 314, for axial rotation. Hence, closures 312 rotate with tube 316.

Shaft 314 is slidable through tube 316 and has a piston 324 secured thereto by a pair of setscrews 316 on a collar 328 provided with an O-ring seal 330. A continuous O-ring seal 332 is provided on the outer periphery of piston 324 and engages the inner surface of housing 318.

Shaft 324 is provided with a central bore 334 having a first outlet 336 communicating with the space in housing 318 defined by one end wall 338 thereof and piston 324. Bore 334 has a second outlet 340 communicating with the space 342 between closures 312. An O-ring seal 344 carried by closure 312 engages the outer periphery of shaft 314. A hose 346 is coupled with shaft 314 and communicates with bore 334 thereof. Hose 346 is adapted to be coupled to a source of air or other fluid under pressure for directing the air outwardly of outlets 336 and 340.

Each closure 312 has a conical shell 348 which decreases in diameter as the corresponding closure 312 is approached. Since closure 312 adjacent journal means 322 is secured by nut 350 to the proximal end of tube 316, the shell 348 corresponding to the other closure 312 will move toward the shell 348 corresponding to the first-mentioned closure 312 as shaft 314 is shifted to the right when viewing FIG. 7. This will occur when air under pressure fills the space between end wall 338 and piston 324. Shells 348 have mating flanges 352 which engage each other and limit further movement of one closure 312 toward the other closure 312.

In use, a green tire 354, having a pair of beads 356, is placed on closures 312 with beads 356 in engagement with continuous O-ring seals 358 provided at the junctions between closures 312 and their associated shells 348. As air is supplied to hose 346, piston 324 will move away from wall 338 so that shells 348 will come together. Simultaneously, air is admitted into space 342 to cause inflation of tire 354. Tire 354 will shift laterally outwardly through a limited distance until the same engages the inner surfaces of shells 348. Since tire 354 is inflated, substantially all of the wrinkles or creases in the side wall thereof are removed and beads 356 thereof are substantially axially aligned with each other. Moreover, the side wall of tire 354 is concentrically and symmetrically disposed about the center line thereof and, in this condition, tire 354 is ready to be balanced. It is to be understood, of course, that apparatus 310 will have initially been balanced so that, when tire 354 is mounted thereon, any imbalance will be due to tire 354 alone.

In use, tire 354 is supported on the inner surface thereof by inflation with air under pressure and is supported on the outer surface thereof by engagement with the inner surfaces of shells 348. All restraints are then removed from apparatus 310 to allow the latter, and thereby tire 354, to rotate freely to seek static equilibrium. When this condition is attained, apparatus 310 is marked in any convenient manner so as to indicate the vertical plane in which the unbalanced portion of tire 354 lies. Weights will then be required to be placed at the side of tire 354 corresponding to the uppermost extremity thereof so as to counterbalance its unbalanced portion. Means may be provided to determine the weight of the unbalanced portion so that a pair of strips, similar to strips 80, may be selected and applied by a bonding agent or otherwise, to tire 354 adjacent to beads 356 thereof with the centers of gravity of the strips being disposed at the intersection of the aforesaid vertical plane and the uppermost side of the tire. Hence, after the weight and location of the unbalanced portion of tire 354 has ben determined, the tire may be balanced in the same way as that described above with respect to tire 20. The strips on tire 354 may, of course, be cured by utilizing the structure of FIG. 9. These strips will then become fused with the side wall of tire 354 so as to form a part thereof.

Apparatus 310 partially stretches tire 354 therein so that the tire partially simulates the disposition thereof when the same is in a mold for curing and forming the same. It has been determined that a tire changes during the curing and forming process but it is not known exactly how much change the tire experiences. The change apparently is not too great since the fabric built into the green tire has characteristics tending to hold the tire in shape and assures that the rubber portion of the tire stretches uniformly as the tire is formed. Since apparatus 310 partially stretches tire 354, the latter is in a disposition resembling the actual disposition of the tire in a mold, and the finished or formed tire will be more accurately balanced after it is removed from the curing and forming mold.

The green tire which is capable of being balanced by the method and apparatus of this invention as described above, is of the type which is formed in the conventional manner. However, tires known as radial ply tires are now being built, such tires being a relatively recent innovation with respect to use on automobiles.

Radial ply tires are preformed and are substantially of the shape of a finished tire after the latter has been removed from a curing and forming mold. Nonetheless, it is believed that the method of balancing of the present invention may be utilized in balancing a radial ply tire notwithstanding the preformed nature thereof. In this respect, the method of balancing would include the mounting of the radial ply tire so that the same would be supported with the bead ends thereof in axial alignment, mounting the radial ply tire for rotation about an axis therethrough, removing all restraints from the radial ply tire so that the same will freely seek static equilibrium to thereby determine the weight and location of its unbalanced portion and, finally, applying strips thereto adjacent the bead ends thereof for counterbalancing the unbalanced portion. The strips, as mentioned above, would preferably be of the same material as that forming the plastic portion of the radial ply tire so that the strips would fuse with the major portion of the tire during the curing and forming operations.

After a group of tires has been formed, and prior to the packaging of the tires for storage or sale, several of the tires are subjected to a radial runout test to determine the uniformity of the layers of material which comprise the tires. Specifically, this test determines whether or not a tire will thump or bump as certain areas of the tire engage the roadway during rolling movement of the tire. This thumping or bumping is due to nonuniform curing and forming in the mold therefor.

Radial runout tests have been performed on tires balanced by the method of this invention and the results show that the presence of a pair of strips 80 adjacent the bead ends of the tires, has no effect on the radial runout test which normally is performed on several tires of a group taken at random. Hence, the presence of strips 80 do not contribute to the undesirable effects arising due to nonuniform curing and forming in a tire mold.

Having thus described the invention, what is claimed as new and desired to be secured by Letters Patent is:

1. The method of balancing a tubular, flexible, unbalanced member having a pair of spaced ends and a circumferentially extending center stretch between said ends, said method comprising the steps of:

supporting the member with the ends thereof in axial alignment with each other;

mounting the supported member for free movement about an axis passing therethrough to permit the member to attain static equilibrium, whereby the member shifts to a disposition where the heavy portion thereof contributing to the unbalanced condition presents the lowermost extremity of the member; and counterbalancing said heavy portion by securing a weight on the member adjacent one of said ends, remote from said center stretch and located in generally opposed relationship to said extremity.

2. The method of balancing a tubular, flexible, unbalanced member having a pair of spaced ends and a circumferentially extending center stretch between said ends, said method comprising the steps of:

supporting the member with the ends thereof in axial alignment with each other;

mounting the supported member for movement about an axis passing therethrough;

removing all restraints from the member to thereby permit the latter to freely seek static equilibrium, whereby the member shifts to a disposition where the heavy portion thereof contributing to the unbalanced condition presents the lowermost extremity of the member; and counterbalancing said heavy portion by securing a weight to the member adjacent one of said ends, remote from said center stretch and located in generally opposed relationship to said extremity.

3. The method of balancing a tubular member having a flexible, unbalanced sidewall generally surrounding the center line of the member and presenting a pair of spaced ends, the sidewall being provided with a circumferentially extending center stretch between said ends, said method comprising the steps of:

supporting the member with the sidewall disposed in concentric relationship to said center line, whereby the sidewall is supported free of undulations;

mounting the supported member for free movement about an axis passing therethrough to permit the member to attain static equilibrium, whereby the member shifts to a disposition where the heavy portion thereof contributing to the unbalanced condition presents the lowermost extremity of the member; and counterbalancing said heavy portion by securing a pair of strips to the member adjacent respective ends thereof, remote from said center stretch and located in generally opposed relationship to said extremity.

4. The method of balancing a tubular, flexible, unbalanced member of a plastic material in initially uncured form, said member having a pair of spaced ends and a circumferentially extending center stretch between said ends, said method comprising the steps of:

supporting the member with the ends thereof in axial alignment with each other;

mounting the supported member for free movement about an axis passing therethrough to permit the member to attain static equilibrium, whereby the member shifts to a disposition where the heavy portion thereof contributing to the unbalanced condition presents the lowermost extremity of the member;

counterbalancing said heavy portion by securing a pair of strips of said material to the member adjacent respective ends thereof, remote from said center stretch and located in generally opposed relationship to said extremity with the centers of gravity of the strips disposed substantially in a plane in which said extremity and the center line of the member are located; and curing said member with said strips thereon to fuse the strips thereto.

5. The method of balancing a tubular, flexible, unbalanced member having a pair of spaced ends and a circumferentially extending center stretch between said ends, said method comprising the steps of:

inflating the member to support the same with the ends thereof in axial alignment with each other, whereby any undulations in the member are removed;

mounting the inflated member for movement about an axis passing therethrough;

removing all restraints from the member to thereby permit the latter to freely seek static equilibrium, whereby the member shifts to a disposition where the heavy portion thereof contributing to the unbalanced condition presents the lowermost extremity of the member; and counterbalancing said heavy portion by securing a pair of weights to the member adjacent respective ends thereof, remote from said center stretch and located in generally opposed relationship to said extremity.

6. The method of balancing as set forth in claim 5, wherein is included the step of restricting the laterally outward movement of the member as the same is inflated.

7. The method of balancing as set forth in claim 6, wherein the step of restricting the movement of said member includes preventing laterally outward movement of the member to permit the same to expand to its full length as it is inflated.

8. The method of balancing as set forth in claim 6, wherein is included the step of moving said ends toward each other and into spaced-apart locations as said member is inflated, said restricting step including preventing further laterally outward movement of the member after the same has moved laterally outwardly through a predetermined distance in response to the movement of said ends toward each other.

9. The method of balancing as set forth in claim 5, wherein said member is formed of a plastic material, each of said weights comprising a strip of said material, and wherein is included the step of curing the member with the strips thereon to fuse the strips thereto.

10. The method of balancing a tubular, flexible, unbalanced member having a pair of spaced ends comprising:

applying mechanical pressure uniformly to the inner surface of the member to support the same with the ends thereof in axial alignment with each other and to smooth out all undulations therein;

mounting the supported member for rotation about an axis passing therethrough;

removing all restraints from the member which prevent rotation about said axis to thereby permit the member to freely seek static equilibrium with the unbalanced portion thereof being disposed on one side of the member in a plane passing through the lowermost extremity thereof; and counterbalancing said unbalanced portion by securing a pair of weights to the member adjacent to respective ends thereof on the side opposite to said one side and at the intersection of said plane and said opposite side, said pressure-applying step including placing the member about a number of radially shiftable, member-engaging shoes and an axially shiftable, shoe-engaging piston, and moving said piston axially of the member to force the shoes against said inner surface thereof.

11. The method of balancing a tubular, flexible, unbalanced member having a pair of spaced ends comprising:

applying mechanical pressure uniformly to the inner surface of the member to support the same with the ends thereof in axial alignment with each other and to smooth out all undulations therein;

mounting the supported member for rotation about an axis passing therethrough;

removing all restraints from the member which prevent rotation about said axis to thereby permit the member to freely seek static equilibrium with the unbalanced portion thereof being disposed on one side of the member in a plane passing through the lowermost extremity thereof; and counterbalancing said unbalanced portion by securing a pair of weights to the member adjacent to respective ends thereof on the side opposite to said one side and at the intersection of said plane and said opposite side, said pressure-applying step including placing the member about a number of radially shiftable, member-engaging shoes and a number of rotatable shafts operably coupled with respective shoes to shift the same radially outwardly upon rotation of the shafts, and rotating the shafts simultaneously to force the shoes against said inner surface of the member.

12. The method of balancing a green tire having an unbalanced side wall comprising the steps of:
closing the ends of the tire;
inflating the tire to support the same with its side wall disposed concentrically about its center line and to smooth out all undulations in the side wall;
restricting the laterally outward movement of the tire as the same is inflated;
mounting the inflated tire for rotation about a substantially horizontal axis coextensive with its center line;
removing all restraints from the tire which prevent rotation about said axis to thereby permit the tire to freely seek static equilibrium with the unbalanced portion thereof being disposed on one side of the member in a plane passing through the lowermost extremity thereof;
determining the weight of said unbalanced portion;
selecting a pair of strips of the material forming the plastic portion of said side wall with the sum of the weights of said strips being substantially equal to the weights of said unbalanced portion;
securing the strips to said tire adjacent to respective ends thereof on the side opposite to said one side with the centers of gravity of the strips being substantially disposed at the intersections of said plane and said opposite side; and
curing the tire with the strips thereon to fuse the strips thereto.

13. The method of balancing as set forth in claim 12, wherein said strips are bonded to the tire, said restricting step including applying pressure to the outer surface of the tire to prevent any laterally outward movement thereof as the same is being inflated and rotated, whereby the tire is expanded to its full length during rotation thereof.

14. The method of balancing as set forth in claim 12, wherein the strips are bonded to said tire, and wherein is included the step of moving said ends of the tire toward each other and into spaced-apart locations as said tire is inflated, said restricting step including applying pressure to the outer surface of the tire to prevent further laterally outward movement thereof after the tire has moved laterally outwardly through a predetermined distance in response to the movement of said ends toward each other.

15. The method of balancing a green tire having an unbalanced side wall comprising the steps of:
positioning the tire with said side wall disposed about an expandable mechanism;
expanding the mechanism to apply mechanical pressure uniformly to predetermined, substantially equally spaced, longitudinally extending locations on the inner surface of the tire to support the same in an upright position with its side wall disposed concentrically about its center line and to smooth out all undulations in the side wall;
mounting the supported tire for rotation about a substantially horizontal axis intersecting and disposed substantially perpendicularly to said center line;
removing all restraints from the tire which prevent rotation about said axis to thereby permit the tire to freely seek static equilibrium with the unbalanced portion thereof being disposed on one side of the member in a plane passing through the lowermost extremity thereof;
determining the weight of said unbalanced portion;
selecting a pair of strips of the material forming the plastic portion of said side wall with the sum of the weights of said strips being substantially equal to the weight of said unbalanced portion;
securing the strips to said tire adjacent to respective ends thereof on the side opposite to said one side with the centers of gravity of the strips being substantially disposed at the intersection of said plane and said opposite side; and
curing the tire with the strips thereon to fuse the strips thereto.

16. The method of balancing as set forth in claim 15, wherein said mechanism includes a number of radially shiftable, tire-engaging shoes and an axially shiftable, shoe-engaging fluid-actuated piston, said expanding step including applying fluid pressure to said piston to move the same axially of the tire and thereby force the shoes into engagement with said inner surface.

17. The method of balancing as set forth in claim 15, wherein said mechanism includes a number of radially shiftable, tire-engaging shoes and a number of rotatable shafts operably coupled with respective shoes to shift the same radially outwardly upon rotation of the shafts, said expanding step including rotating the shafts simultaneously to force the shoes against said inner surface of the tire.

References Cited

UNITED STATES PATENTS 2,429,032 10/1947 Sheahan _____ 156—75
3,048,211 8/1962 Cuthbertson et al. ____ 152—330

OTHER REFERENCES

"New Tires Said To Have a Permanent Built-In Balance," New York Times, June 26, 1957, p. 43.

EARL M. BERGERT, *Primary Examiner.*

HAROLD ANSHER, *Examiner.*